(12) United States Patent
Kobayashi et al.

(10) Patent No.: US 7,707,243 B2
(45) Date of Patent: Apr. 27, 2010

(54) IMAGE PROCESSOR AND METHOD FOR CONTROLLING THE SAME

(75) Inventors: Minako Kobayashi, Ikeda (JP); Masakazu Murakami, Itami (JP); Hironobu Nakata, Itami (JP); Kazumi Sawayanagi, Itami (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1491 days.

(21) Appl. No.: 11/023,806

(22) Filed: Dec. 29, 2004

(65) Prior Publication Data

US 2006/0085676 A1 Apr. 20, 2006

(30) Foreign Application Priority Data

Oct. 14, 2004 (JP) .............................. 2004-300608

(51) Int. Cl.
G06F 15/16 (2006.01)
(52) U.S. Cl. ..................... 709/203; 715/738; 715/739; 715/740; 358/3.22; 358/3.23
(58) Field of Classification Search ................. 709/203; 715/738, 739, 740; 358/3.22, 3.23
See application file for complete search history.

(56) References Cited

U.S. PATENT DOCUMENTS

| 6,252,609 B1 | 6/2001 | Kanno |
| 6,549,304 B1 | 4/2003 | Dow et al. |
| 6,609,162 B1 | 8/2003 | Shimizu et al. |
| 7,120,910 B2 * | 10/2006 | Matsuda et al. ............. 718/102 |
| 7,124,212 B2 * | 10/2006 | Shimizu et al. ............... 710/38 |
| 7,353,463 B2 * | 4/2008 | Stohrer et al. ............... 715/827 |
| 2002/0181004 A1 * | 12/2002 | Morita ...................... 358/1.13 |
| 2003/0050971 A1 | 3/2003 | Okuyama et al. |
| 2004/0172602 A1 | 9/2004 | Iida et al. |

FOREIGN PATENT DOCUMENTS

| JP | 11-088584 A | 3/1999 |
| JP | 11-187165 A | 7/1999 |
| JP | 2000-123159 A | 4/2000 |
| JP | 2000-187573 A | 7/2000 |
| JP | 2001-092760 A | 4/2001 |
| JP | 2002-202946 A | 7/2002 |
| JP | 2003-067159 A | 3/2003 |
| JP | 2003-085085 A | 3/2003 |
| JP | 2004-266471 A | 9/2004 |

OTHER PUBLICATIONS

Japanese Office Action (with English translation) dated Feb. 7, 2006.

* cited by examiner

*Primary Examiner*—Jinsong Hu
(74) *Attorney, Agent, or Firm*—Buchanan Ingersoll & Rooney PC

(57) ABSTRACT

An image forming device includes a table for storing link service function information that indicates a function necessary for providing the link service among functions installed in a computer for each link service, a computer status check portion for checking a function of the computer that is available at present, a provision appropriateness determination portion for determining whether or not each link service can be provided at present in accordance with the link service function information and the check result, and a screen display process portion for displaying identification information of the link service that is determined to be able to be provided.

22 Claims, 15 Drawing Sheets

| LINK SERVICE FUNCTION ID | SERVICE NAME (FUNCTION NAME) | MFP SIDE CONDITION | COMPUTER SIDE CONDITION | FUNCTION PROGRAM | |
|---|---|---|---|---|---|
| R01 | GROUP CIRCULATION | M01 AND (M06 OR M07) | C03 AND C07 AND C13 | PROGRAM_01 | ~70 |
| R02 | OCR FOLDER | M01 AND (M06 OR M07) AND M08 | C01 AND C08 AND C12 | PROGRAM_02 | ~70 |
| R03 | CIRCULATION & OCR FOLDER | M01 AND (M06 OR M07) AND M08 | ·FIRST COMPUTER : C01 AND C08 AND C12 ·SECOND COMPUTER : C03 AND C07 AND C13 AND C12 | PROGRAM_03 | ~70 |
| R04 | TRANSLATION FOLDER | M01 AND (M06 OR M07) AND M08 | C01 AND C02 AND C08 AND C12 | PROGRAM_04 | ~70 |
| ... | ... | ... | ... | ... | |

| FUNCTION ID | FUNCTION CONTENTS | USAGE APPROPRIATENESS FLAG |
|---|---|---|
| M01 | SCAN | 1 |
| M02 | PRINT | 1 |
| M03 | FAX | 1 |
| M04 | PERSONAL BOX | 1 |
| M05 | STORING DATA OVER 10 MB | 0 |
| M06 | FTP TRANSMISSION | 1 |
| M07 | SMB TRANSMISSION | 1 |
| M08 | GROUNDWORK ELIMINATION | 1 |
| ⋮ | ⋮ | ⋮ |

FIG. 6 (a)
72A(72)
COMPUTER PROFILE OF THE COMPUTER 2A

| FUNCTION ID | FUNCTION CONTENTS | USAGE APPROPRIATENESS FLAG |
|---|---|---|
| C01 | OCR | 1 |
| C02 | TRANSLATION | 0 |
| C04 | SHARED FOLDER | 1 |
| C07 | ELECTRONIC MAIL | 1 |
| C08 | GROUNDWORK ELIMINATION | 1 |
| C09 | STORING DATA OVER 1 MB | 1 |
| C10 | COMBINING PLURAL FILES | 1 |
| C12 | FTP/SMB TRANSMISSION AND RECEPTION | 1 |
| ⋮ | ⋮ | ⋮ |

FIG. 6 (b)
72S(72)
COMPUTER PROFILE OF THE COMPUTER 2S

| FUNCTION ID | FUNCTION CONTENTS | USAGE APPROPRIATENESS FLAG |
|---|---|---|
| C03 | GROUP CIRCULATION | 1 |
| C04 | SHARED FOLDER | 1 |
| C05 | APPLICATION FORM DATABASE | 1 |
| C06 | TYPICAL FORM DATABASE | 0 |
| C07 | ELECTRONIC MAIL | 1 |
| C11 | FILE SEARCH | 1 |
| C12 | FTP/SMB TRANSMISSION AND RECEPTION | 1 |
| ⋮ | ⋮ | ⋮ |

FIG. 7

USER NAME : USER A
USER ID : A014087B
PASSWORD : xxxxxxxxx

COMPUTERS THAT USER A CAN USE :
  COMPUTER 2A
  COMPUTER 2S
  COMPUTER 2T

LIST OF LINK SERVICE FUNCTIONS THAT WERE USED IN THE PAST BY USER A :

| LINK SERVICE FUNCTION ID | FUNCTION NAME | DATE OF USE |
|---|---|---|
| R02 | GROUP CIRCULATION | 2004/10/01 |
| R01 | OCR FOLDER | 2004/10/03 |
| R03 | CIRCULATION & OCR FOLDER | 2004/10/06 |

71

IMAGE PROCESSOR AND METHOD FOR CONTROLLING THE SAME

This application is based on Japanese Patent Application No. 2004-300608 filed on Oct. 14, 2004, the contents of which are hereby incorporated by reference.

BACKGROUND OF THE INVENTION

1. Field of the Invention

The present invention relates to an image processor such as an MFP that is connected to other devices via a network and a method for controlling the image processor.

2. Description of the Prior Art

An image processor called a multifunction device or an MFP (Multi Function Peripherals) that is equipped with various functions including a copy, a scanner and a fax has become commonplace. Recently, in particular, a new type image processor is coming into widespread use that has more functions including a network printer and a document server by connecting to computers such as a personal computer via a network.

In addition, along with improvement of a CPU performance and a large capacity of storage devices available at a low cost, it has become easy to realize the entire or a part of control process for the image processing or each unit by software. Thus, extension of functions of the image processor has become easier than before, and a new function can be added easily after the image processor has appeared in the market.

Along with these developments, some methods for

Along with these developments, some methods for using the image processor more conveniently have been proposed.

Japanese unexamined patent publication No. 2003-67159 teaches a method in which plural copying machines are connected with a host computer via a network. The host computer stores data of places where the plural copying machines are placed. When the host computer receives a network search signal from a copying machine, the host computer sends the data of places where the plural copying machines are placed to the copying machine that issued the network search signal for so that the data are displayed. Thus, the user can find other copying machine easily when a copying machine that is regularly used by the user is out of order.

Japanese unexamined patent publication No. 2002-202946 teaches a method for managing a digital image processor that realizes an extended function by installing function program cards that respectively store function programs such as a copy function or a printer function. According to this method, when a power is supplied, the function program card and a hardware module embedded in the digital image processor are detected automatically so that an installation state of the functions is displayed. When a certain operation is performed, the display of the installation state is canceled and abnormal start up process is executed. Thus, the user can check that a desired function program and hardware are set before the normal starting up process.

In addition, another method is also proposed in which a function of the image processor and a function of the computer such as a personal computer are combined so as to provide a service to a user. For example, a service is proposed for storing an image file of a scanned image in a predetermined folder of the computer by linking a scan function of the image processor with a file management function of the computer. It is expected that various services in combination of functions of both devices will be proposed in the future.

However, according to the conventional methods described in the above-mentioned documents, a user cannot know whether the above-mentioned linking services are available or not at the present even though the user can see the state of the image processor.

SUMMARY OF THE INVENTION

An object of the present invention is to provide information about whether a service that is realized by linking an image processor such as an MFP with a computer such as a personal computer is available or not to a user in an easily understood manner.

An image processor according to an aspect of the present invention is an image processor having a service process portion for performing a process for providing a service concerning an image to a user by linking a computer. The image processor includes a provision condition information storage portion for storing provision condition information that indicates a function necessary for providing the service among functions that are installed in the computer for each service, a function status inquiry portion for inquiring the computer about a function that is available at present, a service provision appropriateness determination portion for determining whether or not each service can be provided in accordance with the provision condition information and a result of the inquiry by the function status inquiry portion, and a display portion for displaying identification information of the service that was determined to be able to be provided at present by the service provision appropriateness determination portion.

Preferably, it is determined whether a function of the image processor is also available or not, and in accordance with the result it is determined whether or not each service can be provided at present. In this case, the image processor is structured as follows. The provision condition information storage portion stores provision condition information that indicates a necessary function for providing the service among first functions that are functions installed in the image processor and a necessary function for providing the service among second functions that are functions installed in the computer for each service. The function status determination portion determines the first functions that are available at present. The function status inquiry portion inquires each of the computers about the second functions that are available at present. The service provision appropriateness determination portion determines whether or not each service can be provided at present in accordance with the provision condition information, a determination result by the function status determination portion and an inquiry result by the function status inquiry portion.

According to the present invention, a user can know readily whether or not a service is available that is realized by linking an image processor such as an MFP with a computer such as a personal computer.

BRIEF DESCRIPTION OF THE DRAWINGS

FIG. 4 shows an example of a link service function table.
FIG. 5 shows an example of an MFP function table.
FIGS. 6(a) and 6(b) show examples of a computer profile.
FIG. 7 shows an example of a user profile.

DESCRIPTION OF THE PREFERRED EMBODIMENTS

Hereinafter, the present invention will be explained more in detail with reference to embodiments and drawings.

Figure 1:
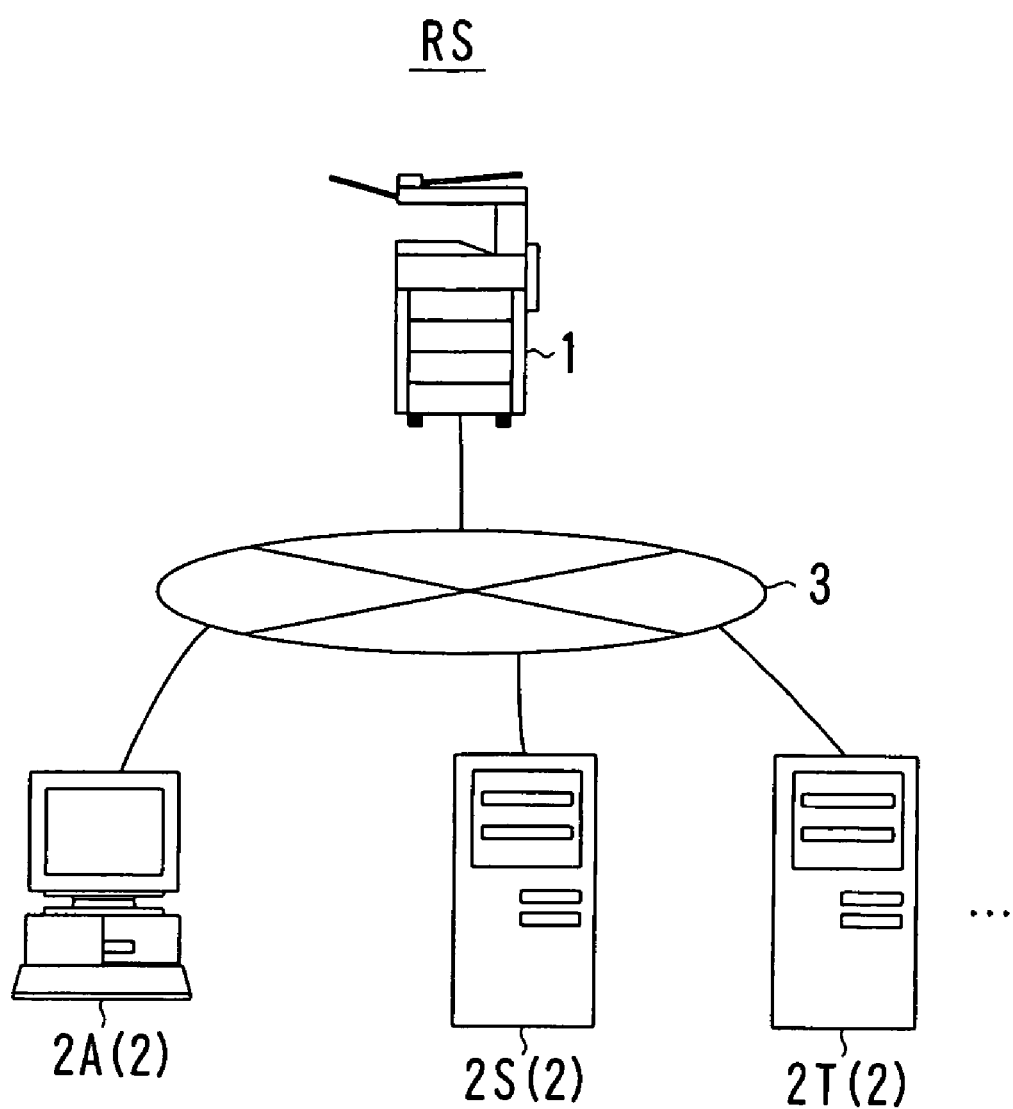
FIG. 1 shows an example of an overall structure of a link process system.
Figure 2:
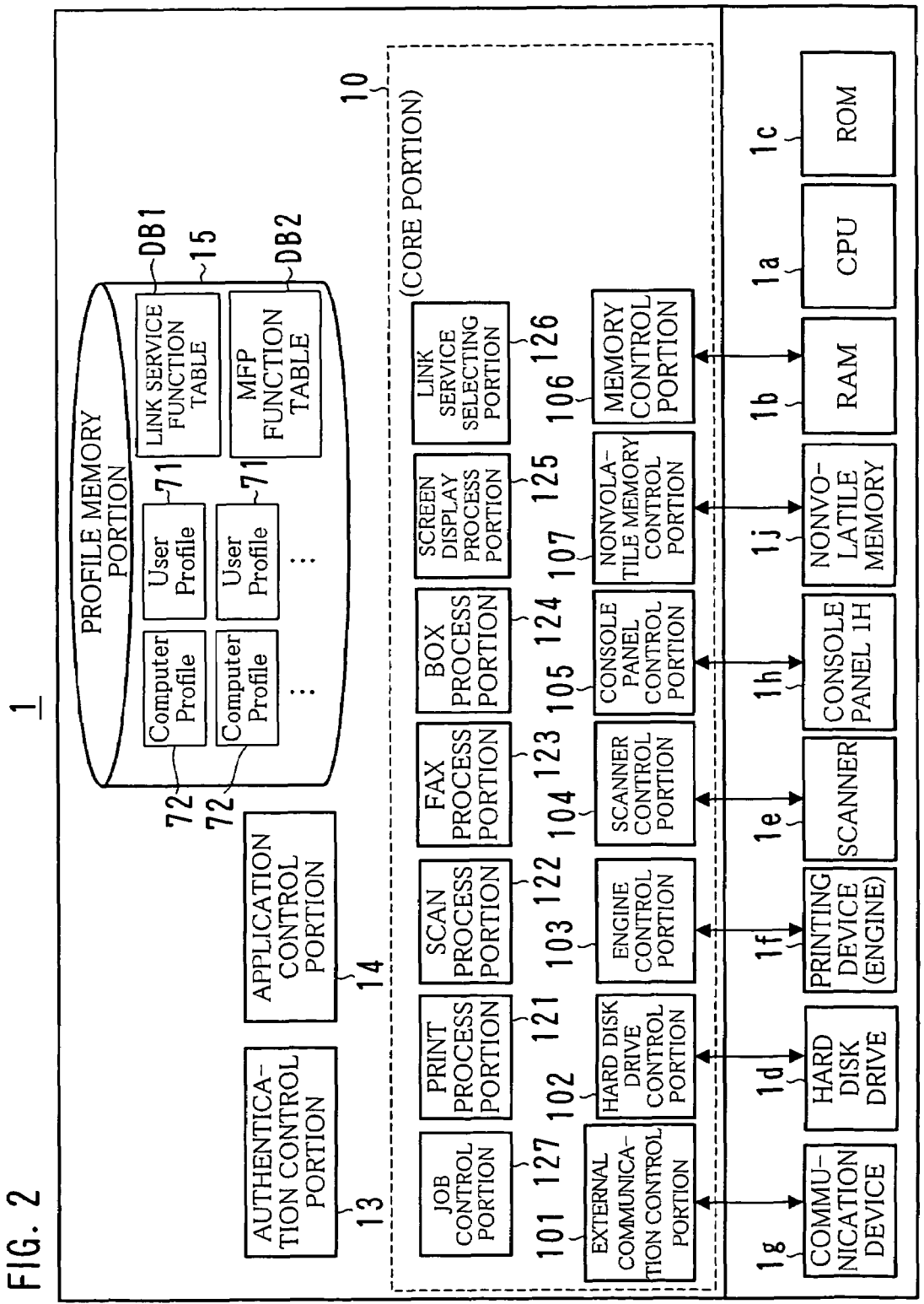
FIG. 2 shows an example of a platform of an image forming device.
Figure 3:
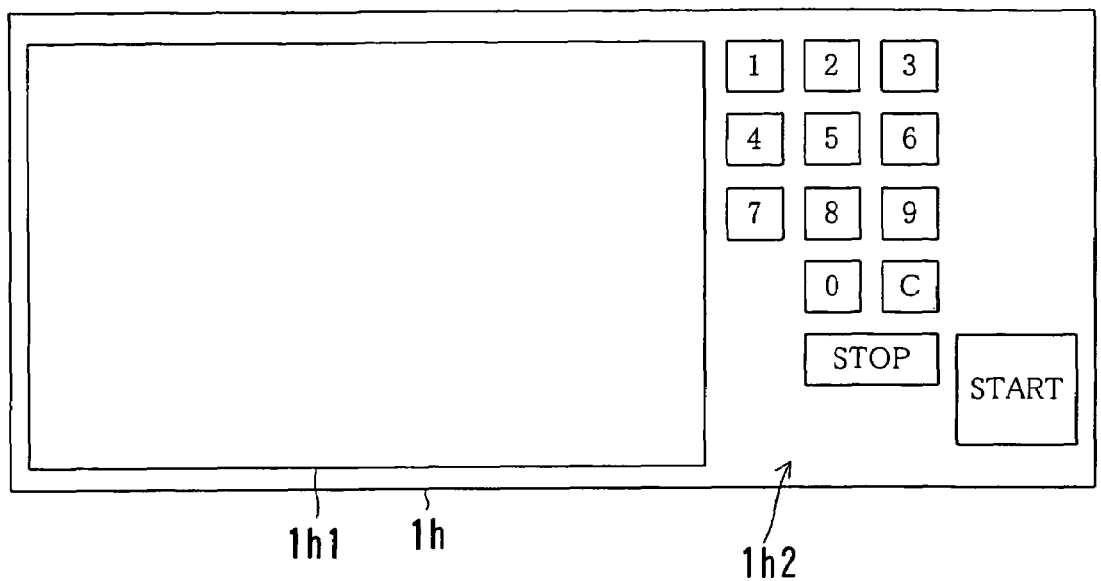
FIG. 3 shows an example of a console panel.

FIG. 1 shows an example of an overall structure of a link process system RS, FIG. 2 shows an example of a platform of an image forming device 1, and FIG. 3 shows an example of a console panel 1h.

As shown in FIG. 1, the link process system RS includes the image forming device 1 according to the present invention, a plurality of computers 2 and a communication line 3. The image forming device 1 and the computers 2 are connected to each other via the communication line 3. As the communication line 3, a LAN, the Internet, a public telephone line or a private line can be used. In the following description, a link process system RS that is installed in a company is exemplified.

In the computer 2, there is installed a driver for controlling the image forming device 1 as well as a program for performing a process linking with the image forming device 1. As the computer 2, a personal computer, a workstation or a server machine can be used. The link process system RS includes a personal computer for each user who is an employee, a group server for each group such as a division or a section, and a hub server for each hub such as an office or a branch a as the computer 2. In the following description, the personal computer of the user A, the group server of the group to which the user A belong and the hub server of the hub where the group is located may be especially referred to as a "computer 2A", a "computer 2S" and a "computer 2T", respectively.

The image forming device 1 is a device in which functions of a copy, network printing, a scanner, a fax and a document server are integrated. It may be called a multifunction device or an MFP (Multi Function Peripherals). A function of the document server may be called a "box function" or a "personal box function" because a storage area that is called a "box" or a "personal box" is assigned to each user. Thus, each user can store files in his or her personal box.

The image forming device 1 has hardware including a CPU 1a, a RAM 1b, a ROM 1c, a hard disk drive 1d, a scanner 1e, a printing device (engine) 1f, a communication device 1g, a console panel 1h, a nonvolatile memory 1j and various control circuits as shown in FIG. 2.

The scanner 1e is a device for reading images such as photographs, characters, pictures or charts on sheets of paper of an original (hereinafter, it may be simply referred to as an "original") optically so as to generate image data. The printing device 1f is a device for printing images read by the scanner 1e or images of image data received from the computer 2 on a sheet of paper.

The console panel 1h includes a display portion 1h1 and an operating button unit 1h2 having plural operating buttons as shown in FIG. 3.

The operating button unit 1h2 includes plural keys for entering numbers, characters or symbols, a sensor for recognizing a pressed key and a transmission circuit for sending a signal indicating the recognized key to the CPU 1a.

The display portion 1h1 displays a screen for giving a user operating the image forming device 1a message or an instruction, a screen for the user to enter setting contents or process contents and a screen for indicating an image generated by the image forming device 1 or a result of a process. In this embodiment, a touch panel is used as the display portion 1h1. Therefore, the display portion 1h1 has a function of detecting a position on the touch panel where a user touched with his or her finger and sending a signal indicating a result of the detection to the CPU 1a.

In this way, the console panel 1h plays a role of user interface for a user who operates the image forming device 1 directly.

A communication device 1g shown in FIG. 2 is a device for performing communication with the computer 2. As the communication device 1g, an NIC (Network Interface Card), a modem or a TA (Terminal Adapter) can be used.

The nonvolatile memory 1 is a memory such as an EEPROM or a flash memory in which data can be rewritten and are nonvolatile. The ROM 1c is a read only memory. Although a ROM is included in a nonvolatile memory generally, the EEPROM or the flash memory are distinguished from the ROM in this embodiment, so the formers are referred to as "nonvolatile memory 1j" and the latter is referred to as "ROM 1c".

In the hard disk drive 1d, there is installed a program for realizing the function of a core portion 10, an authentication control portion 13, an application control portion 14 and a profile memory portion 15 as shown in FIG. 2 as well as data. It is possible to store the entire or a part of the program or the data in the nonvolatile memory 1j or the ROM 1c. The program is executed by the CPU 1a. Alternatively, a part or the entire of these functions may be realized not by software but by hardware such as a processor (a control circuit).

Figure 8:
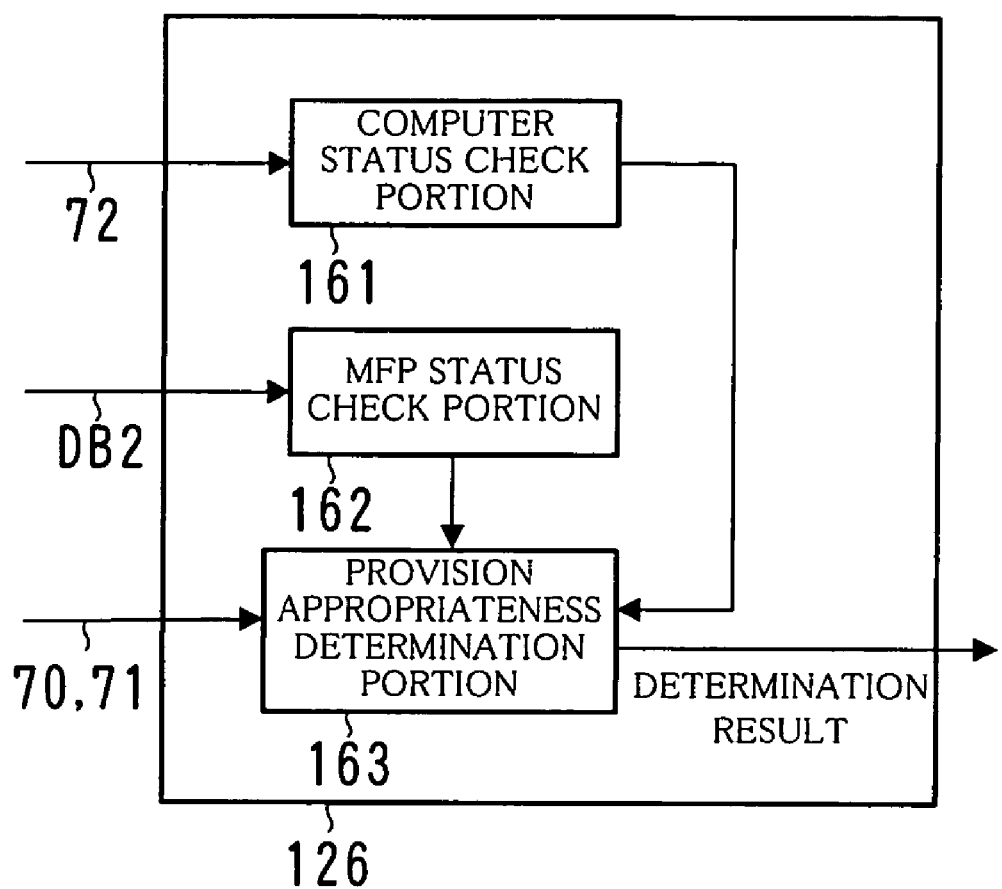
FIG. 8 shows an example of a structure of a link service selecting portion.

FIG. 4 shows an example of a link service function table DB1, FIG. 5 shows an example of an MFP function table DB2, FIGS. 6(a) and 6(b) show examples of a computer profile 72, FIG. 7 shows an example of a user profile 71, FIG. 8 shows an example of a structure of a link service selecting portion 126.

A process in each portion shown in FIG. 2 will be described below in detail. The core portion 10 includes an external communication control portion 101, a hard disk drive control portion 102, an engine control portion 103, a scanner control portion 104, a console panel control portion 105, a memory control portion 106, a nonvolatile memory control portion 107, a print process portion 121, a scan process portion 122, a fax process portion 123, a box process portion 124, a screen display process portion 125, a link service selecting portion 126 and a job control portion 127.

The external communication control portion 101 through the nonvolatile memory control portion 107 control directly hardware that constitutes the image forming device 1. Namely, they play a role of a hardware controller. The external communication control portion 101 controls the communication device 1g, the hard disk drive control portion 102 controls the hard disk drive 1d, the engine control portion 103 controls the engine that is the printing device 1f, the scanner control portion 104 controls the scanner 1e, the console panel control portion 105 controls the console panel 1h, the memory control portion 106 controls the RAM 1b, and the nonvolatile memory control portion 107 controls the nonvolatile memory 1j.

The print process portion 121 through the screen display process portion 125 control the external communication control portion 101 through the nonvolatile memory control portion 107 so as to realize a basic function of the image forming device 1.

The print process portion 121 controls the external communication control portion 101, the memory control portion 106 and the engine control portion 103 so as to execute a print process in accordance with print data received from the computer 2 or the like. The scan process portion 122 controls the scanner control portion 104 and the memory control portion 106 so as to read an image of an original set on an original table of the scanner 1e and generate image data.

The fax process portion 123 controls the external communication control portion 101, the scanner control portion 104 and the memory control portion 106 so as to send image data of an image of an original set on an original table of the scanner 1e by fax after calling to a designated destination if a user want the fax transmission. If a fax signal is received from other device, it controls the external communication control portion 101, the engine control portion 103 and the memory control portion 106 so as to start receiving fax data and print an image thereof on a sheet of paper.

The box process portion 124 controls the hard disk drive control portion 102 and the memory control portion 106 so as to store a file in the personal box, to change a name or other attribution of a file stored in the personal box, to read a file stored in the personal box onto the RAM 1b, to update the file or to erase the file. The screen display process portion 125 controls the console panel control portion 105 so as to display a screen corresponding to an operation by a user or current process situation in the image forming device 1.

The job control portion 127 controls the print process portion 121 through the screen display process portion 125 so as to extract jobs accumulated in the queue sequentially and to execute the job.

The authentication control portion 13 performs an authentication about whether or not the user who wants to use the image forming device 1 is a regular user. The application control portion 14 executes a control process for providing an application service to a user that is realized by combining and linking a function of the image forming device 1 with a function of the computer 2. In the following description, such a service is referred to as a "link service", and a function of providing the link service is referred to as a "link service function".

The profile memory portion 15 stores the link service function table DB1, the MFP function table DB2, the user profile 71 and the computer profile 72.

The link service function table DB1 stores link service function information 70 in advance for each link service function as shown in FIG. 4. The link service function information 70 indicates items about conditions necessary for realizing the link service function. A "link service function ID" is identification information for distinguishing the link service function from other link service functions. A "service name" is a name of a service (a link service) that is provided by the link service function and is used as identification information for a user to distinguish the link service. It is also used as a name of the link service function.

A "MFP side condition" indicates a function of the MFP that is the image forming device 1 that is necessary for realizing the link service function. A values such as "M01" or "M02" stored in this field indicates an ID of each necessary function (hereinafter referred to as a "function ID").

A "computer side condition" indicates a function of the computer 2 that is necessary for realizing the link service function. A value such as "C01" or "C02" stored in this field indicates a function ID of each necessary function. In some cases, conditions are indicated for two computers 2 (a first computer and a second computer) as the link service function information 70 of "R03". This indicates that the link service is realized by a link process of the image forming device 1 and two computers 2.

A "function program" indicates a program name of the application program used by the image forming device 1 for realizing the link service function.

A "group circulation" link service function is a function in which data of an image of a document read by the scanner 1e of the image forming device 1 is stored in a predetermined folder (directory) in the computer 2 for circulating it among members (users) of the group to which the user belongs. An "OCR folder" link service function is a function in which text data is generated by recognizing characters or symbols included in an image read by the scanner 1e, and the text data is stored in a predetermined folder in the computer 2. Namely, it is a function similar to an OCR (Optical Character Reader) that is an optical character reading device.

A "circulation & OCR folder" link service function is a function in which text data is generated by recognizing characters or symbols included in an image read by the scanner 1e, and the text data is stored in a predetermined folder in the computer 2, and it is circulated among members (users) of the group to which the user belongs.

A "translation folder" link service function is a function of recognizing characters or symbols included in an image read by the scanner 1e so as to produce a text, translating the text from the original language (e.g., Japanese) to other language (e.g., English), and storing data of the translated text in a predetermined folder in the computer 2.

The MFP function table DB2 stores list information of functions installed in the MFP that is the image forming device 1 as shown in FIG. 5. One record corresponds to one function.

The "function ID" is identification information for distinguishing the function from other functions. The "function contents" indicate what is realized by the function. A "usage appropriateness flag" indicates whether or not the function can be used at present (whether it is able or unable). If the usage appropriateness flag is "1", it means that the function can be used (is able). If the usage appropriateness flag is "0", it means that the function cannot be used (is unable). Whether it can be used or not can be determined by detecting states of hardware and software in the image forming device 1. The detection is executed regularly or at a predetermined timing (e.g., when trying to control hardware or when trying to start software), and a value of the usage appropriateness flag is updated in accordance with the result if necessary.

A "scan" function is a function of reading an image of an original set on an original table of the scanner 1e to produce an electronic data. A "print" function is a function of printing an image on a sheet of paper in accordance with given image data. A "fax" function is a function of sending and receiving fax data to and from other device.

A "personal box" function is a function of assigning a personal box to each user and managing the same. A "storing data over 10 MB" function is a function of saving data having a size over 10 megabytes generated during the process in a recording medium except the RAM 1b.

A "FTP transmission" function is a function of sending data to other device by using an FTP (File Transfer Protocol). A "SMB transmission" function is a function of sending data to other device by using an SMB (Server Message Block) protocol. A "groundwork elimination" function is a function for correcting an image by eliminating a grid of dots or the like in a background (groundwork) of the image obtained by scanning.

One computer profile 72 is stored in each computer 2. For example, the computer 2A and the computer 2S stores a computer profile 72A shown in FIG. 6(*a*) and a computer profile 72S shown in FIG. 6(*b*) as the computer profile 72, respectively.

The computer profile 72 stores list information of functions of the computer 2. The "function ID", the "function contents" and the "usage appropriateness flag" are the same as those in the MFP function table DB2. The computer profile 72 is obtained regularly or at a predetermined timing from the computer 2.

"OCR" function is a function of recognizing characters or symbols included in an image so as to convert them into text data. A "translation" function is a function of translating a text described in an original language (e.g., Japanese) in text data to a text described in another language (e.g., English) so as to produce other text data.

A "group circulation" function is a function of circulating document data (an image file or a text file) among users in a group. A "shared folder" function is a function of realizing that a folder (a directory) in the computer 2 and files included in the folder can be used in other computers 2, too.

An "application form database" function is a function of managing a database including image data for printing various application forms that are used in the company where this link process system RS is installed. A "typical form database" function is a function of managing a database including image data for printing typical forms except the application forms.

An "electronic mail" function is a function of sending and receiving electronic mail. A "groundwork elimination" function is a function of eliminating a grid of dots or the like in a background (groundwork) of an image obtained by scanning. A "storing data over 1 MB" function is a function of saving data having a size over 1 megabyte generated during the process in a recording medium except the main memory. A "combining plural files" function is a function of combining designated plural files so as to generate one file.

A "file search" function is a function of searching a file including a designated character string or character from a hard disk drive or the like. An "FTP/SMB transmission and reception" function is a function of sending and receiving data by using the FTP or the SMB corresponding to a protocol that is used in the device of the party on the other end of the communication.

All these functions of the computer 2 are realized by installing available application software or groupware in the computer 2 and by setting in a predetermined manner.

One user profile 71 is prepared for each user in advance. The user profile 71 includes a user name of the user, a user ID for distinguishing the user from other users, a password of user authentication, information of a computer 2 that the user can use (namely, that the user is authorized to use) and information of a list of link service functions that were used in the past as shown in FIG. 7.

Each of information stored in the profile memory portion 15 as described above is made and described in accordance with rules of XML (Extensible Markup Language) or MIB (Management Information Base), for example.

The link service selecting portion 126 shown in FIG. 2 includes a computer status check portion 161, an MFP status check portion 162 and a provision appropriateness determination portion 163 as shown in FIG. 8, so as to perform a process for selecting a link service that can be provided to a user who logged in the image forming device 1. More detailed process of each portion will be described later.

Figure 9:
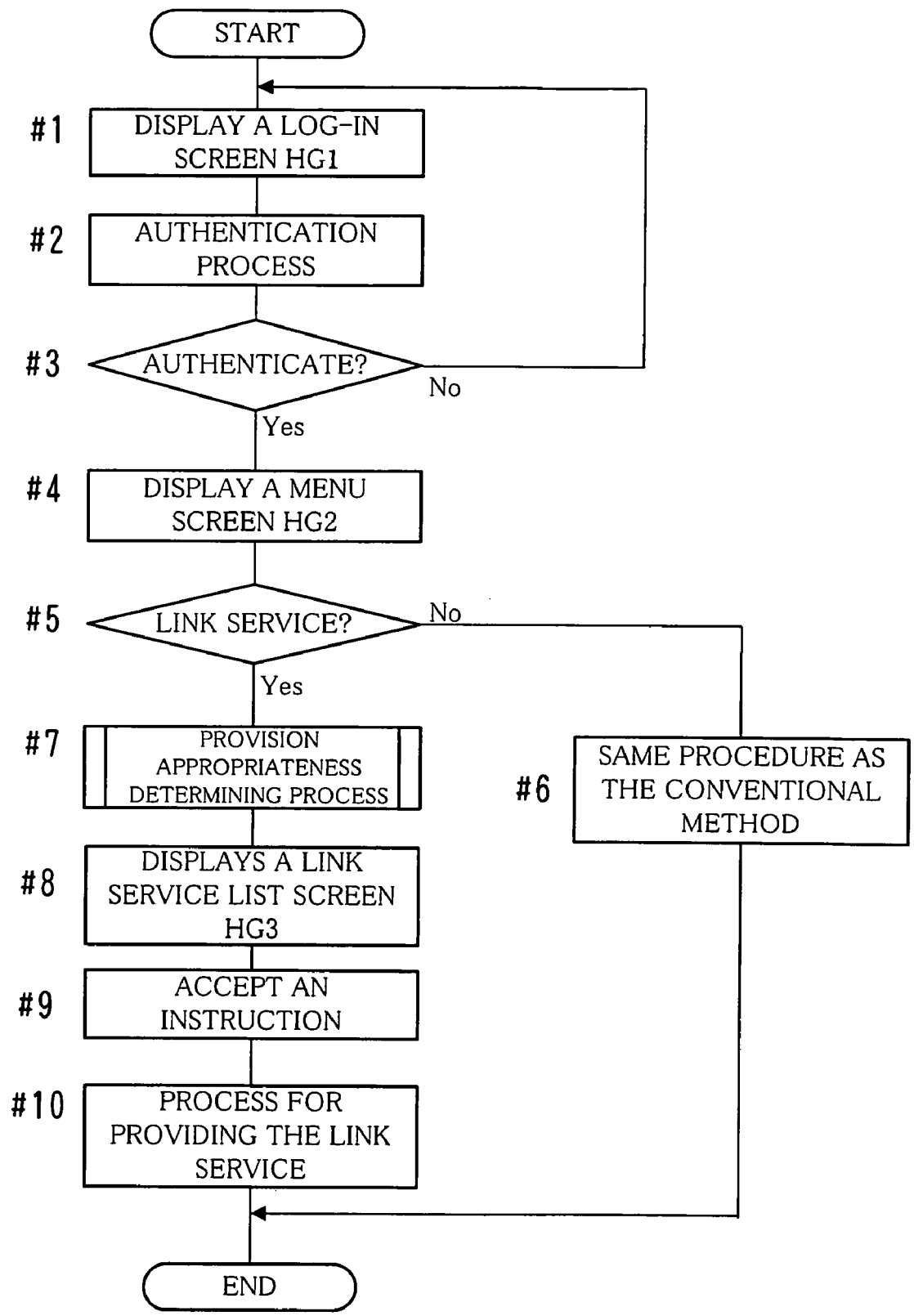
FIG. 9 is a flowchart showing an example of a flow of a general process in the image forming device.
Figure 10:
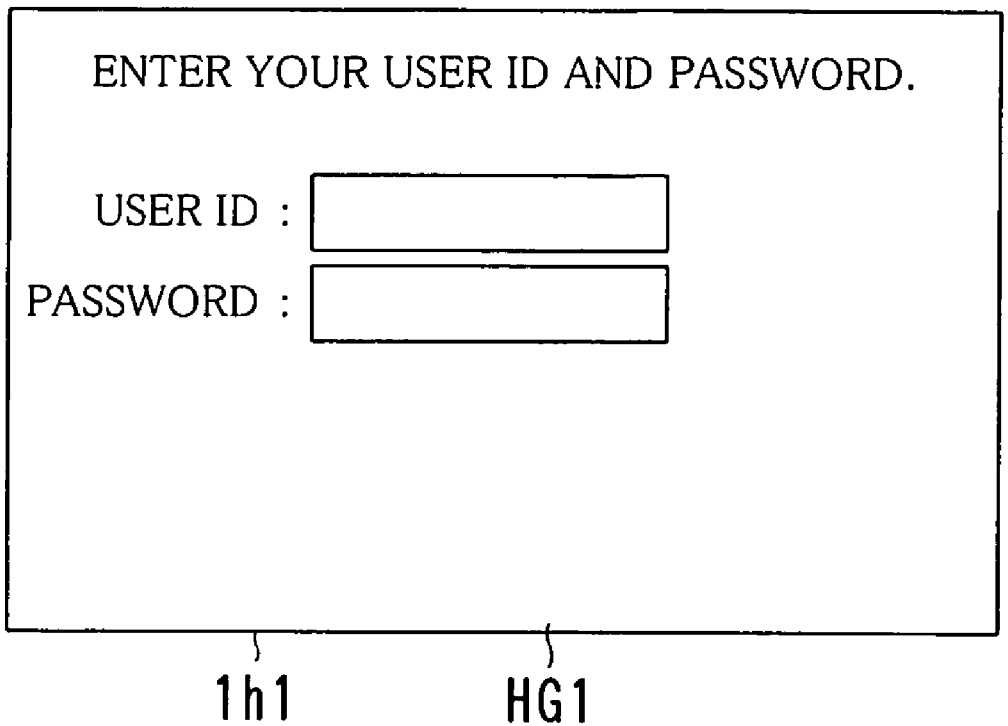
FIG. 10 shows an example of a log-in screen.
Figure 11:
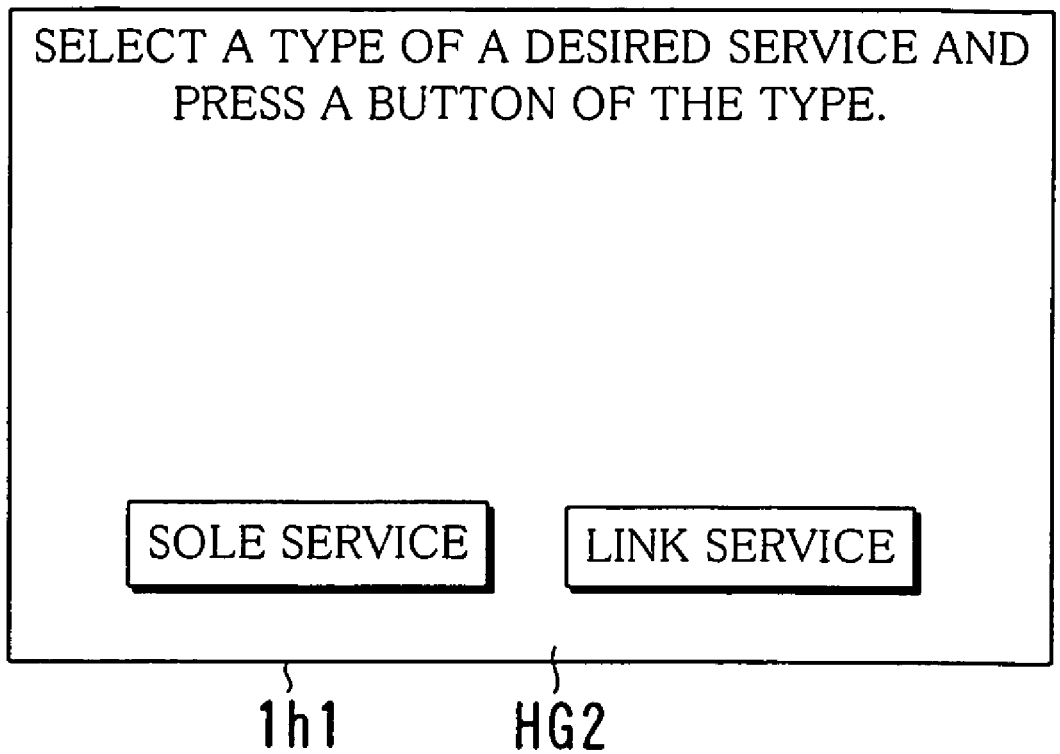
FIG. 11 shows an example of a menu screen.
Figure 12:
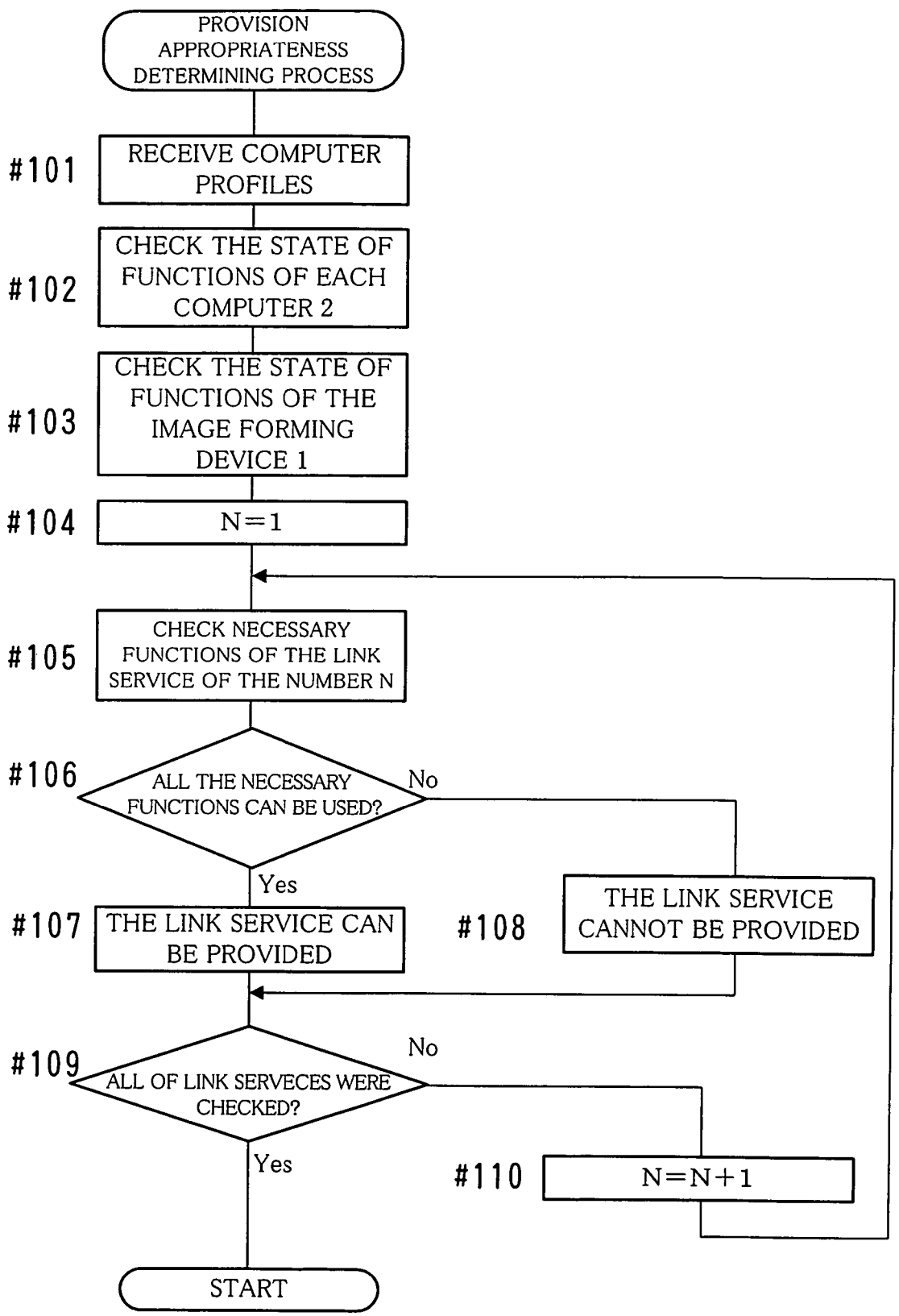
FIG. 12 is a flowchart showing an example of a flow of a provision appropriateness determining process.
Figure 13:
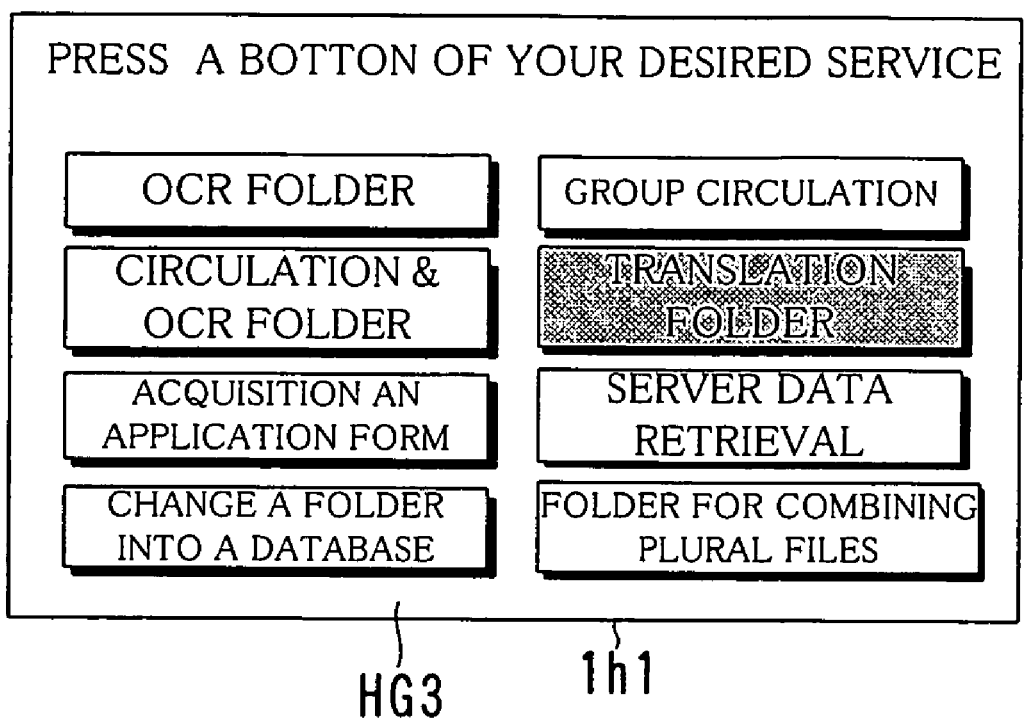
FIG. 13 shows an example of a link service list screen.

FIG. 9 is a flowchart showing an example of a flow of a general process in the image forming device 1, FIG. 10 shows an example of a log-in screen HG1, FIG. 11 shows an example of a menu screen HG2, FIG. 12 is a flowchart showing an example of a flow of a provision appropriateness determining process, FIG. 13 shows an example of a link service list screen HG3, FIGS. 14(*a*)-14(*d*) are flowcharts showing examples of a flow of a process in the image forming device 1 when providing a link service, and FIGS. 15(*a*)-15(*d*) are flowcharts showing examples of a flow of a process in the computer 2 when providing a link service.

Next, procedure of processes in each portion of the core portion 10, the authentication control portion 13 and the application control portion 14, and timings of obtaining or updating data stored in the profile memory portion 15 shown in FIG. 2 will be described with reference to the flowchart.

In FIG. 9, the screen display process portion 125 displays a log-in screen HG1 as shown in FIG. 10 as a waiting screen on the display portion 1*h*1 when nobody uses the image forming device 1 directly (#1). A user who wants to use the image forming device 1 operates the operating button unit 1*h*2 so as to enter his or her user ID and password.

Then, the authentication control portion 13 performs the authentication process in accordance with the entered user ID and password (#2). Namely, it searches the user profile 71 of the user by using the entered user ID as a search key. When the user profile 71 is found, the entered password is verified with the password indicated by the user profile 71. If they are identical to one another, the authentication is given that indicates that the user is a regular user (Yes in #3). Thus, the user has logged in the image forming device 1. If the user profile 71 is not found or if the passwords are not identical to one another (No in #3), the user cannot log in the image forming device 1.

When the log-in process is completed, the screen display process portion 125 displays a menu screen HG2 as shown in FIG. 11 (#4). The user selects a type of a desired service (namely, a type of a desired process that is performed by the image forming device 1). If the user wants to select a process performed only by the image forming device 1, a "sole service" button is pressed. If the user want to select a process that is performed by cooperation of the image forming device 1 and the computer 2, a "link service" button is selected. Note that each button in the menu screen HG2 is a one-touch button. Namely, the button can be selected by touching only once with a finger. Each button in other screens displayed on the display portion 1*h*1 that will be described later is the same.

If the "sole service" button is selected (No in #5), the screen display process portion 125 displays a list screen of a service that can be provided only by the image forming device 1 (for example, copy of an original). Then, in the same procedure as the conventional method, a process is performed for providing a service selected by the user from the list screen (#6). Namely, the job control portion 127 generates a job of the service selected by the user and registers the same in the queue. When it comes a turn of the job, the print process portion 121 thorough the box process portion 124 start performing the job.

When the "link service" button is selected (Yes in #5), the link service selecting portion 126 determines and selects a link service that can be provided to the user who logged in the procedure shown in FIG. 12 (#7).

The computer status check portion 161 in the link service selecting portion 126 (see FIG. 8) accesses each computer 2, requests the computer profiles 72 (see FIGS. 6(a) and 6(b)) indicating current states respectively, and receives them (#101). Namely, it inquires whether or not the function of the computer 2 can be used at present. Then, if there is a computer profile 72 that has been obtained before, it is erased, and the received computer profile 72 is stored. Alternatively, it is possible to obtain only the difference from the computer profile 72 that was obtained before (i.e., a part that has been updated since the previous obtaining time) and to rewrite the computer profile 72. In this manner, the state of functions of each computer 2 is checked (#102).

However, if there is a computer 2 that cannot execute communication or a computer 2 that did not respond to the inquiry, all the usage appropriateness flags of all functions indicated in the computer profile 72 of the computer 2 that was obtained previously are rewritten to "0". Thus, it is indicated in the computer profile 72 that the computer 2 cannot be linked.

Note that the computer 2 generates the computer profile 72 in the following procedure and sends the same to the image forming device 1. In the computer 2, list information of functions that are used for the link service with the image forming device 1 is prepared in advance. When accepting the request (inquiry) from the image forming device 1, the computer 2 detects states of hardware and software of the computer 2. Then, in accordance with the detection result, it is determined whether or not each function indicated in the list information can be realized, so as to generate the computer profile 72.

Sequentially with the process of Steps #101 and #102 or in parallel with the process, the MFP status check portion 162 updates the MFP function table DB2 (see FIG. 5) and checks which can be used at present among functions of the image forming device 1 (#103).

The provision appropriateness determination portion 163 compares the check result in Steps #102 and #103 with the link service function table DB1, so as to determine whether or not each link service can be provided to the user who logged in (#105-#110).

For example, in the case of a link service function of the first record in the link service function table DB1, the MFP that is the image forming device 1 is required a function having a function ID of "M01" and a function having a function ID of either "M06" or "M07". Therefore, it is determined whether or not both of these two functions can be used by comparing with the check result in Step #103.

Similarly, the computer 2 is required to have all four functions having function IDs of "C03", "C07", "C12" and "C13", respectively. Therefore, it is determined whether all these four functions can be used or not for each computer 2 by comparing with the check result in Step #102. However, the object of the determination is the computer 2 that the user who logged in is authorized to use, and other computers 2 that the user are not permitted to use are excepted. Whether or not the user has the right of use can be determined in accordance with the user profile 71 (see FIG. 7) of the user.

Then, as a result of the comparison, if all the necessary function can be used in the image forming device 1 and if all the necessary function can be used in either one of the computers 2 (Yes in #106), it is decided that the link service function can be used and the link service can be provided by linking with the computer 2 that can use the above-mentioned four functions (#107). Otherwise (No in #106), it is decided that the link service function cannot be used, and the link service cannot be provided (#108).

The determination is performed similarly also for link services of the second through the last records (#105-#110).

With reference to FIG. 9 again, the screen display process portion 125 shown in FIG. 2 displays the link service list screen HG3 including buttons (one-touch buttons) of the link services that were selected and determined to be able to be provided to the user in Step #7 on the display portion 1h1 as shown in FIG. 13 (#8).

Namely, the link service that was determined to be unable to be provided is not displayed. However, if there is a history record indicating that the user has ever used the link service in the user profile 71 of the user, the button of the link service is displayed in a design different from the button of the link service that can be used (for example, in a design using gray color). Thus, the user can be informed that the link service function the user has ever used cannot be used at present due to a certain trouble (e.g., a trouble in the image forming device 1, the computer 2, or the communication line 3).

Note that it is possible to indicate the name of the link service as well as the name of the computer 2 to be a linking party on the button of the link service that can be provided to the user.

The user issues an instruction to the image forming device 1 for executing the process of the link service by pressing the button of the desired link service. Accepting this instruction (#9), the application control portion 14 and the job control portion 127 shown in FIG. 2 execute the process for providing the link service to the user in the following procedure (#10).

The job control portion 127 generates a job of the link service and registers the same in the queue. When it comes the turn of the job, the application control portion 14 activates the application program for the link service and controls each portion so that a predetermined process is performed.

Figure 14A:
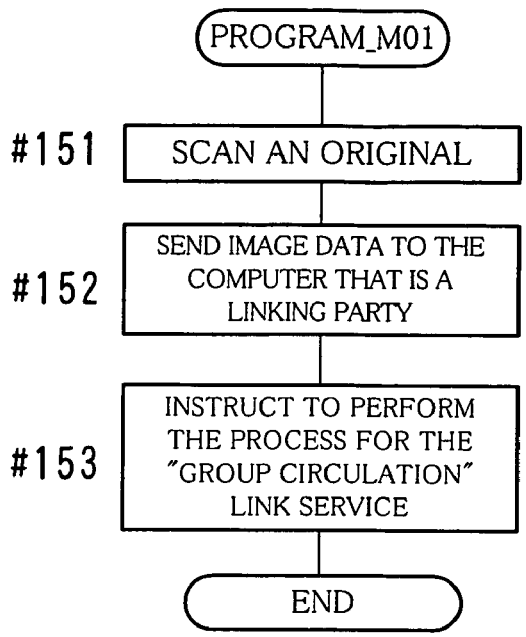
FIGS. 14(a)-14(d) are flowcharts showing examples of a flow of a process in the image forming device when providing a link service.

For example, in the case of a job of the "group circulation" link service, the image forming device 1 activates an application program having a program name of "PROGRAM_M01" so as to perform the process shown in FIG. 14(a). Namely, an original that is set on the original table of the scanner 1e is scanned so as to generate image data (#151), which is sent to the computer 2 (for example, the computer 2S) that is a linking party (#152). In this case, an instruction for performing the process for the "group circulation" link service, and information about the user who logged in is sent (#153).

Figure 15A:
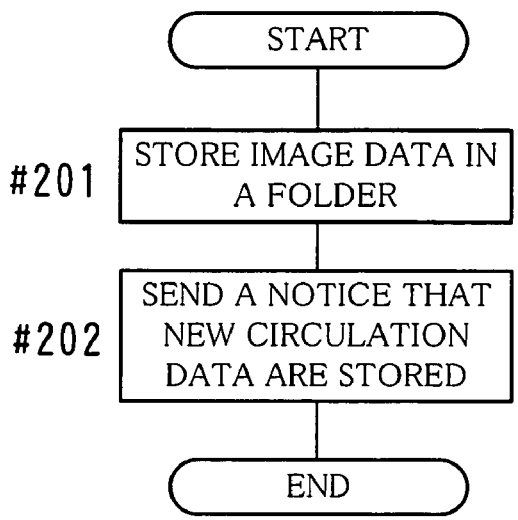
FIGS. 15(a)-15(d) are flowcharts showing examples of a flow of a process in the computer when providing a link service.

When receiving this instruction and image data, the computer 2S activates a program for the link service corresponding to the instruction and necessary application program so as to perform the process as shown in FIG. 15(a). Namely, the received image data are stored in the folder that is assigned to a group of the user (#201). Then, a notice that new circulation data are stored is sent to each user who belongs to the group by electronic mail (#202).

Figure 14B:
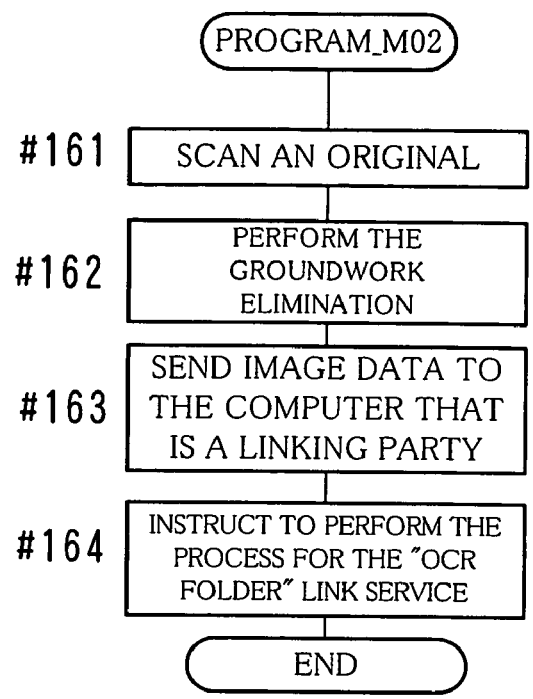

In the case of a job of the "OCR folder" link service, the image forming device 1 activates a "PROGRAM_M02" so as to perform a process as shown in FIG. 14(b). It is the same as the case shown in FIG. 14(a) that an image of an original is scanned to generate image, which is sent to the computer 2 that is a linking party (#161, #163). However, the groundwork elimination is performed for the image obtained by the scan (#162). In addition, when sending the image data, an instruction indicating that a process for the "OCR folder" link service should be performed is provided, and information that indicates the user who has logged in is sent (#164).

Figure 15B:
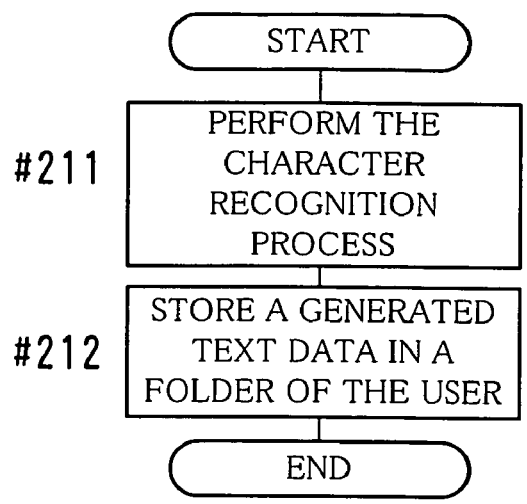

When receiving the instruction and the image data, the computer 2 (e.g., the computer 2A) activates a program for the link service corresponding to the instruction and a necessary application program so as to perform a process as shown in FIG. 15(b). An area of characters is extracted from the image of the received image data, and a character recognition process is performed (#211). Generated text data are stored in a folder of the user (#212).

Figure 14C:
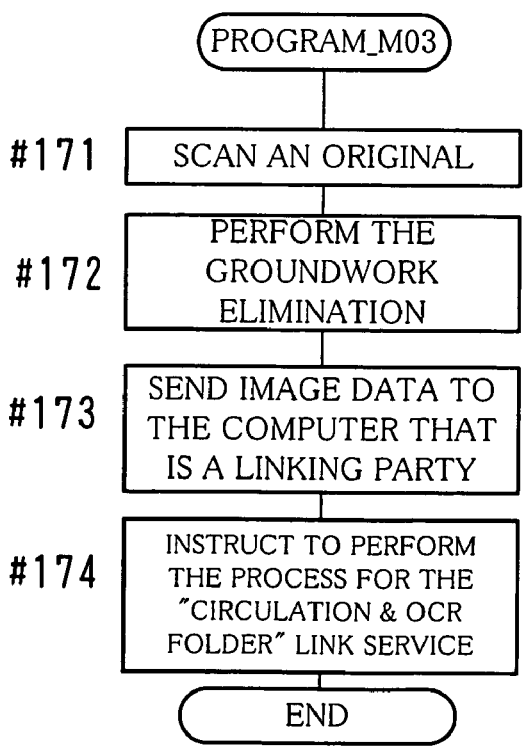

In the case of the "circulation & OCR folder" link service, the image forming device 1 activates a "PROGRAM_M03" so as to perform a process as shown in FIG. 14(c). It is the same as the case of FIG. 14(b) that an image of an original is scanned and the groundwork elimination is performed (#171, #172). This process for the link service is performed by linking with two computers 2. Therefore, the generated image data as well as information indicating the user and the second computer are sent to the first computer (e.g., the computer 2A) that performs the OCR process, so as to give an instruction indicating that a process for the "circulation & OCR folder" link service should be performed (#173, #174).

Figure 15C:
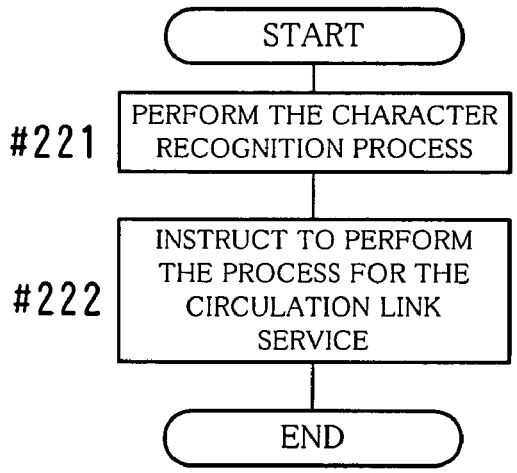

When receiving the instruction and the image data, the first computer (computer 2A) activates a program for the link service corresponding to the instruction and a necessary application program so as to perform a process as shown in FIG. 15(c). Namely, an area of characters is extracted from the image of the received image data and the character recognition process is performed so as to generate text data (#221, #222). The text data are sent to the second computer (e.g., the computer 2S) (#223). In this case, an instruction indicating that a process for the "group circulation" link service should be performed, and information about the user is sent (#153).

When receiving the instruction and the image data, the second computer (the computer 2S) activates a program for the link service corresponding to the instruction and a necessary application program so as to perform a process as shown in FIG. 15(a). This process is the same as described before.

Figure 14D:
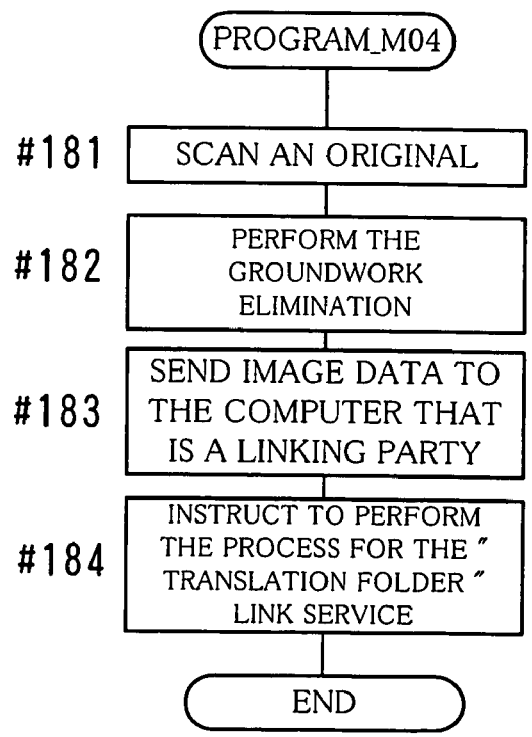

In the case of the "translation folder" link service, the image forming device 1 activates a "PROGRAM_M04" so as to perform a process as shown in FIG. 14(d). It is the same as the case of FIG. 14(b) that the groundwork elimination process is performed for the scanned original image and the image data are sent to the computer 2 that is a linking party (#181-#183). However, an instruction indicating that the process for the "translation folder" link service should be performed is given when sending the image data (#184).

Figure 15D:
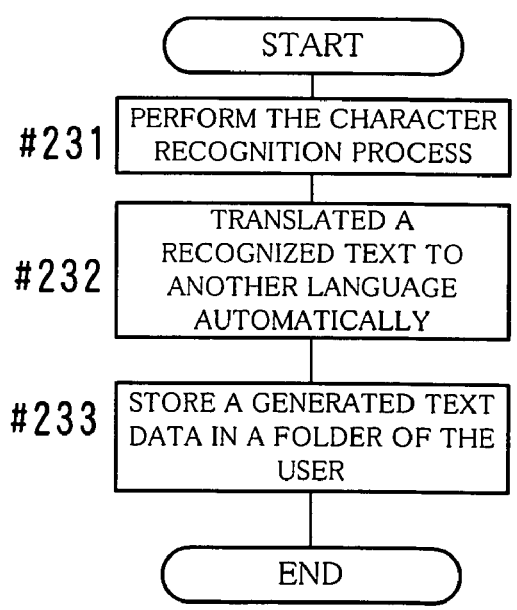

When receiving the instruction and the image data, the computer 2 (e.g., computer 2A) activates a program for link service corresponding to the instruction and a necessary application program so as to perform a process as shown in FIG. 15(d). An area of characters is extracted from an image of the received image data so as to perform the character recognition process (#231). Thus, the language of the recognized text is translated automatically to another language (e.g., the language that the user designated in advance) (#232). Then, the data of the translated text (a text file) are stored in a folder of the user (#233).

According to this embodiment, the user can know readily whether the service that is realized by linking the image processor such as the MFP with the computer such as a personal computer can be provided or not.

Although the four link services shown in FIG. 4 are exemplified in this embodiment, the link process system RS can be applied to other link services, too. For example, in order to provide a link service for printing an application form stored in the computer 2, the image forming device 1 and the computer 2 perform the following link process.

When the user operates the console panel 1h so as to select the link service, the image forming device 1 instructs the computer 2 that has an application database function to send an application list to the image forming device 1. The computer 2 sends the application list responding to the instruction. Thus, the application list is displayed on the display portion 1h1.

The user selects a desired application from the list. Then, the image forming device 1 instructs the computer 2 to send the application form. The computer 2 sends data for printing the application form to the image forming device 1 responding to the instruction. Then, the image forming device 1 prints the application form by using the received data for printing.

Furthermore, the structure of the entire or a part of the image forming device 1, the process contents, the process order, the structure of the profile and the table and the contents of the link service can be changed if necessary in accordance with the spirit of the present invention.

The present invention can be used eligibly especially for an image processor such as an MFP that performs various processes by linking with the computer 2.

While the presently preferred embodiments of the present invention have been shown and described, it will be understood that the present invention is not limited thereto, and that various changes and modifications may be made by those skilled in the art without departing from the scope of the invention as set forth in the appended claims.

What is claimed is:

1. An image processor, comprising:
a service process portion for performing a process for providing a service concerning an image to a user by linking a computer;
a function status determination portion for determining a function that is available in the image processor;
a function status inquiry portion for inquiring of the computer about a function that is available in the computer;
a service provision appropriateness determination portion for determining a service that is able to be provided in accordance with the determination result by the function status determination portion and the inquiry result by the function status inquiry portion; and
a display portion for displaying identification information of the service that was determined to be able to be provided by the service provision appropriateness determination portion;
wherein the service process portion starts a process for providing the service when the service is selected by the user; and
one of functions installed in the image processor is an image data producing function for reading an image of an original and producing data thereof,
one of functions installed in the computer is a character recognition function for recognizing characters in an image,
one of provided services is a text data producing service for generating text data of a character string in an original image read by the image processor and storing them in the computer,
the service provision appropriateness determination portion determines that the text data producing service can be provided when the determination result by the function status determination portion indicates that the image data producing function is available and the inquiry result indicates that the character recognition function is available, and
the service process portion sends data of an original image read by the image reader portion to the computer and gives an instruction indicating that a character recognition process should be performed for the image so as to store the generated text data to the computer when the text data producing service is selected.

2. The image processor according to claim 1, wherein
the function status determination portion determines a function that is available at present,
the function status inquiry portion inquires about a function that is available at present, and
the service provision appropriateness determination portion determines a service that is able to be provided at present.

3. The image processor according to claim 1, wherein
there is installed at least one of a scan function, a print function and a fax transmission function,
the function installed in the computer is realized by an application program installed in the computer.

4. The image processor according to claim 1, wherein the service provision appropriateness determination portion determines that the service can be provided if a plurality of functions installed in the image processor are necessary or a plurality of functions installed in the computer are necessary for realizing the service and when the determination result by the function status determination portion indicates that all the plurality of functions installed in the image processor are available and the inquiry result indicates that all the plurality of functions installed in the computer are available.

5. The image processor according to claim 1, further comprising a service history storage portion for storing service history information that indicates a service that has ever been provided to the user, wherein the display portion displays identification information of the service that is not able to be provided but has ever been provided to the user together with identification information of the service that is able to be provided at present in a manner distinguishing them from one another.

6. An image processor, comprising:
a service process portion for performing a process for providing a service concerning an image to a user by linking a computer;
a function status determination portion for determining a function that is available in the image processor;
a function status inquiry portion for inquiring of the computer about a function that is available in the computer;
a service provision appropriateness determination portion for determining a service that is able to be provided in accordance with the determination result by the function status determination portion and the inquiry result by the function status inquiry portion; and
a display portion for displaying identification information of the service that was determined to be able to be provided by the service provision appropriateness determination portion;
wherein the service process portion starts a process for providing the service when the service is selected by the user; and
one of functions installed in the image processor is an image data producing function for reading an image of an original and producing data thereof,
one of functions installed in the computer is a data reading function for plural members to read data in turn,
one of provided services is a circulation service for circulating an original image read by the image processor among plural members,
the service provision appropriateness determination portion determines that the circulation service can be provided when the determination result by the function status determination portion indicates that the image data producing function is available and the inquiry result indicates that the data reading function is available, and
the service process portion sends data of an original image read by the image reader portion to the computer and gives an instruction to the computer when the circulation service is selected, the instruction indicating that a process for circulating the image data among predetermined members should be performed.

7. The image processor according to claim 6, wherein
the function status determination portion determines a function that is available at present,
the function status inquiry portion inquires about a function that is available at present, and
the service provision appropriateness determination portion determines a service that is able to be provided at present.

8. The image processor according to claim 6, wherein
there is installed at least one of a scan function, a print function and a fax transmission function,
the function installed in the computer is realized by an application program installed in the computer.

9. The image processor according to claim 6, wherein the service provision appropriateness determination portion determines that the service can be provided if a plurality of functions installed in the image processor are necessary or a plurality of functions installed in the computer are necessary for realizing the service and when the determination result by the function status determination portion indicates that all the plurality of functions installed in the image processor are available and the inquiry result indicates that all of the plurality functions installed in the computer are available.

10. The image processor according to claim 6, further comprising a service history storage portion for storing service history information that indicates a service that has ever been provided to the user, wherein the display portion displays identification information of the service that is not able to be provided but has ever been provided to the user together with identification information of the service that is able to be provided at present in a manner distinguishing them from one another.

11. An image processor, comprising:
a service process portion for performing a process for providing a service concerning an image to a user by linking a computer;
a function status determination portion for determining a function that is available in the image processor;
a function status inquiry portion for inquiring of the computer about a function that is available in the computer;
a service provision appropriateness determination portion for determining a service that is able to be provided in accordance with the determination result by the function status determination portion and the inquiry result by the function status inquiry portion:
a display portion for displaying identification information of the service that was determined to be able to be provided by the service provision appropriateness determination portion;
wherein the service process portion starts a process for providing the service when the service is selected by the user; and
one of functions installed in the image processor is an image data producing function for reading an image of an original and producing data thereof,
one of functions installed in the computer is a character recognition function for recognizing characters in the image, and another one is a translation function for translating a document written in a predetermined language into another predetermined language, one of provided services is a translation service for translating a text in an original read by the image processor into another language different from the text and storing data of the translated text in the computer, the service provision appropriateness determination portion determines that the translation service can be provided if the determination result by the function status determination portion indicates that the image data producing function is available and the inquiry result indicates that both the character recognition function and the translation function are available, and the service process portion sends data of the original image read by the image reader portion to the computer and gives an instruction to the computer when the translation service is selected, the instruction indicating that a text indicated in the image should be translated into a predetermined language to be stored.

12. The image processor according to claim 11, wherein the function status determination portion determines a function that is available at present, the function status inquiry portion inquires about a function that is available at present, and the service provision appropriateness determination portion determines a service that is able to be provided at present.

13. The image processor according to claim 11, wherein there is installed at least one of a scan function, a print function and a fax transmission function, the function installed in the computer is realized by an application program installed in the computer.

14. The image processor according to claim 11, wherein the service provision appropriateness determination portion determines that the service can be provided if a plurality of functions installed in the image processor are necessary or a plurality of functions installed in the computer are necessary for realizing the service and when the determination result by the function status determination portion indicates that all the plurality of functions installed in the image processor are available and the inquiry result indicates that all of the plurality functions installed in the computer are available.

15. The image processor according to claim 11, further comprising a service history storage portion for storing service history information that indicates a service that has ever been provided to the user, wherein the display portion displays identification information of the service that is not able to be provided but has ever been provided to the user together with identification information of the service that is able to be provided at present in a manner distinguishing them from one another.

16. An image processor, comprising:

a service process portion for performing a process for providing a service concerning an image to a user by linking a computer;

a function status determination portion for determining a function that is available in the image processor;

a function status inquiry portion for inquiring of the computer about a function that is available in the computer;

a service provision appropriateness determination portion for determining a service that is able to be provided in accordance with the determination result by the function status determination portion and the inquiry result by the function status inquiry portion;

a display portion for displaying identification information of the service that was determined to be able to be provided by the service provision appropriateness determination portion;

a provision condition information storage portion for storing provision condition information for each service, the provision condition information indicating a function available in the image processor for providing the service and a function available in the computer for providing the service wherein the service provision appropriateness determination portion determines that the service can be provided when the inquiry result indicates that the function indicated in the provision condition information of the service is available is obtained from at least one of the computers; and a usage right storage portion for storing usage right information that indicates the computer that the user is authorized to use, wherein the service provision appropriateness determination portion determines that the service that is provided by linking with the computer that the user is not authorized to use cannot be provided regardless of the inquiry result.

17. A method for controlling an image processor that performs a process for providing a service concerning an image to a user by linking a computer, the method comprising the steps of:

determining a function that is available in the image processor wherein one of functions installed in the image processor is an image data producing function for reading an image of an original and producing data thereof;

inquiring of the computer about a function that is available in the computer wherein one of the functions installed in the computer is a character recognition function for recognizing characters of an image;

determining a service that can be provided in accordance with a result of the determination about the function in the image processor and a result of the inquiry wherein one of the provided services is a text data producing service for generating text data of a character string in an original image read by the image processor and storing them in the computer, wherein when it is determined that the image data producing function is available and the character recognition function is available it is determined that the text data producing service can be provided, data of an original image read by the image reader portion is sent to the computer and an instruction is given indicating that a character recognition process should be performed for the image so as to store the generated text data to the computer when the text data producing service is selected; and displaying identification information of the service that was determined to be able to be provided.

18. A method for controlling an image processor that performs a process for providing a service concerning an image to a user by linking a computer, the method comprising the steps of:

determining a function that is available in the image processor, wherein one of functions installed in the image processor is an image data producing function for reading an image of an original and producing data thereof;

inquiring of the computer about a function that is available in the computer, wherein one of the functions installed in the computer is a data reading function for plural members to read data in turn;

determining a service that can be provided in accordance with a result of the determination about the function in the image processor and a result of the inquiry wherein one of the provided services is a circulation service for circulating an original image read by the image processor among plural members, wherein when it is determined that the image data producing function is available and the data reading function is available it is determined that the circulation service can be provided and data of an original image read by the image reader portion is sent to the computer and an instruction is given to the computer when the circulation service is selected, the instruction indicating that a process for circulating the image data among predetermined members should be performed; and displaying identification information of the service that was determined to be able to be provided.

19. A method for controlling an image processor that performs a process for providing a service concerning an image to a user by linking a computer, the method comprising the steps of:

determining a function that is available in the image processor, wherein one of the functions installed in the image processor is an image data producing function for reading an image of an original producing data thereof;

inquiring of the computer about a function that is available in the computer, wherein one of the functions installed in the computer is a character recognition function for recognizing characters in the image and another function is a translation function for translating a document written in a predetermined language into another predetermined language;

determining a service that can be provided in accordance with a result of the determination about the function in the image processor and a result of the inquiry, wherein one of provided services is a translation service for translating a text in an original read by the image processor into another language different from the text and storing data of the translated text in the computer, wherein when it is determined that the image data producing function is available and that both the character recognition function and the translation function are available it is determined that the translation service can be provided and data of the original image read by the image reader portion is sent to the computer and an instruction is given to the computer when the translation service is selected, the instruction indicating that a text indicated in the image should be translated into a predetermined language to be stored; and displaying identification information of the service that was determined to be able to be provided.

20. A computer readable storage medium storing computer program instructions which when executed by an image processor including a computer programmed with the instructions causes the computer to perform the steps of:

determining a function that is available in the image processor wherein one of functions installed in the image processor is an image data producing function for reading an image of an original and producing data thereof;

inquiring of the computer about a function that is available in the computer wherein one of the functions installed in the computer is a character recognition function for recognizing characters of an image;

determining a service that can be provided in accordance with a result of the determination about the function in the image processor and a result of the inquiry wherein one of the provided services is a text data producing service for generating text data of a character string in an original image read by the image processor and storing them in the computer, wherein when it is determined that the image data producing function is available and the character recognition function is available it is determined that the text data producing service can be provided, data of an original image read by the image reader portion is sent to the computer, and an instruction is given indicating that a character recognition process should be performed for the image so as to store the generated text data to the computer when the text data producing service is selected; and displaying identification information of the service that was determined to be able to be provided.

21. A computer readable storage medium storing computer program instructions which when executed by an image processor including a computer programmed with the instructions causes the computer to perform the steps of:

determining a function that is available in the image processor, wherein one of functions installed in the image processor is an image data producing function for reading an image of an original and producing data thereof;

inquiring of the computer about a function that is available in the computer wherein one of the functions installed in the computer is a data reading function for plural members to read data in turn;

determining a service that can be provided in accordance with a result of the determination about the function in the image processor and a result of the inquiry wherein one of the provided services is a circulation service for circulating an original image read by the image processor among plural members, wherein when it is determined that the image data producing function is available and the data reading function is available it is determined that the circulation service can be provided and data of an original image read by the image reader portion is sent to the computer and an instruction is given to the computer when the circulation service is selected, the instruction indicating that a process for circulating the image data among predetermined members should be performed; and displaying identification information of the service that was determined to be able to be provided.

22. A computer readable storage medium storing computer program instructions which when executed by an image processor including a computer programmed with the instructions causes the computer to perform the steps of:

determining a function that is available in the image processor, wherein one of the functions installed in the image processor is an image data producing function for reading an image of an original producing data thereof;

inquiring of the computer about a function that is available in the computer, wherein one of the functions installed in the computer is a character recognition function for recognizing characters in the image and another function is a translation function for translating a document written in a predetermined language into another predetermined language;

determining a service that can be provided in accordance with a result of the determination about the function in the image processor and a result of the inquiry, wherein one of provided services is a translation service for translating a text in an original read by the image processor into another language different from the text and storing data of the translated text in the computer, wherein when it is determined that the image data producing function is available and that both the character recognition function and the translation function are available it is determined that the translation service can be provided and data of the original image read by the image reader portion is sent to the computer and an instruction is given to the computer when the translation service is selected, the instruction indicating that a text indicated in the image should be translated into a predetermined language to be stored; and displaying identification information of the service that was determined to be able to be provided.

* * * * *